United States Patent
Agrawal et al.

(10) Patent No.: US 11,366,817 B2
(45) Date of Patent: Jun. 21, 2022

(54) INTENT BASED SECOND PASS RANKER FOR RANKING AGGREGATES

(71) Applicant: Microsoft Technology Licensing, LLC, Redmond, WA (US)

(72) Inventors: Parag Agrawal, Sunnyvale, CA (US); Aastha Jain, Sunnyvale, CA (US); Yafei Wang, Sunnyvale, CA (US); Ashwin Narasimha Murthy, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 16/528,060

(22) Filed: Jul. 31, 2019

(65) Prior Publication Data
US 2021/0034635 A1    Feb. 4, 2021

(51) Int. Cl.
*G06F 16/2457* (2019.01)
*G06N 20/00* (2019.01)
*G06F 16/248* (2019.01)

(52) U.S. Cl.
CPC ...... *G06F 16/24578* (2019.01); *G06F 16/248* (2019.01); *G06N 20/00* (2019.01)

(58) Field of Classification Search
CPC .. G06F 16/24578; G06F 16/248; G06N 20/00
USPC ........................................................ 707/734
See application file for complete search history.

(56) References Cited

U.S. PATENT DOCUMENTS

| | | | | |
|---|---|---|---|---|
| 2014/0280550 A1* | 9/2014 | Glass | ..... | H04L 67/306 709/204 |
| 2016/0078355 A1* | 3/2016 | Clark | ..... | G06N 5/043 706/52 |
| 2017/0316071 A1* | 11/2017 | Hao | ..... | G06F 16/248 |
| 2019/0311301 A1* | 10/2019 | Pyati | ..... | G06F 16/901 |

\* cited by examiner

*Primary Examiner* — Hosain T Alam
*Assistant Examiner* — Saba Ahmed
(74) *Attorney, Agent, or Firm* — Nicholson De Vos Webster & Elliott LLP

(57) ABSTRACT

Technologies for scoring and ranking cohorts containing content items using a machine-learned model are provided. The disclosed techniques include a cross-cohort optimization system that stores, within memory, cohort definition criteria for each cohort of a plurality of cohorts. The optimization system, for a particular user, for each cohort, identifies a plurality of content items that belong to the specific cohort based upon the cohort definition criteria. Using a machine-learned model, the optimization system generates a score for the specific cohort with respect to the particular user's intentions. The optimization system generates a ranking for the plurality of cohorts based on the respective scores of each cohort. The optimization system causes the plurality of content items of each cohort to be displayed concurrently on a computing device of the particular user. Display order for the plurality of cohorts is based on the ranking determined for the plurality of cohorts.

18 Claims, 5 Drawing Sheets

INTENT BASED SECOND PASS RANKER FOR RANKING AGGREGATES

TECHNICAL FIELD

The present disclosure relates to machine learned optimization for ranking groups of content items for presentation on a client device.

BACKGROUND

Content management systems are designed to provide content items to users for consumption. Content items may represent content such as photos, videos, job posts, news articles, other users to connect with, documents, user posts, audio, and many more. Content items may be grouped together in groups, referred to as cohorts. The grouping of content items within cohorts may be based upon common features of grouped content items. For example, if a cohort contains suggested users that a target user may want to connect with, then the cohort may be defined by common features of the suggested users such as, each of the suggested users work at the same company as the target user or each of the suggested users attended the same school as the target user. In another example, content items related to a specific topic may be grouped together to form a cohort defined by the specific topic. Different cohorts of content items may be presented to the target user within a user session for the purpose of causing user-engagement by the target user. Cohorts provide the target user with an explanation as to why groups of content items are being presented to the target user.

Conventional content management systems that implement grouping content items into cohorts often present the cohorts in a predefined format. For example, content items within the "people you may know" cohort may be presented first followed by a "subject matter you may be interested in" cohort, and so on. However, predefining the order for presenting cohort may be effective for increasing user engagement when users' intentions align with the predetermined order of the cohorts. For example, if a user is interested in growing his/her network, then presenting the "people you may know" cohort first may result in increased engagement. However, if a second user intends to consume content about the topic of machine learning, then presenting cohorts in a predetermined order, where the "people you may know" cohort is presented first and the subject matter about machine learning cohort is presented third or fourth, is unlikely to increase user engagement of the second user because the cohort containing content items related to machine learning is presented far below other cohorts of content items not related to the main intention of the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a content management system performs content item selection events that involve selecting content items to present to a client device. The content items may be grouped into cohorts for presentation on a client device. A cohort may represent a group of content items grouped together based upon one or more common attributes. For example, content items that represent articles on artificial intelligence may be grouped into an "articles related to artificial intelligence" cohort. In another example, content items representing other users who attended University X may be grouped together to form "people who attended University X" cohort.

In an embodiment, the selected content items are presented within the cohorts, where the cohorts are ranked based upon their respective relevance to a particular user's intentions. The content management system may implement a cross-cohort optimization model that optimizes a presentation order for the cohorts by ranking each of the cohorts with respect to the particular user's intentions. For example, if the particular user's intention is to increase their network of connected users, then the cross-cohort optimization model may rank the cohorts such that cohorts containing content items aimed at increasing the particular user's network of connected users are ranked higher than other cohorts. Cohorts with higher rankings may be presented to the particular user first, in order to facilitate user engagement with the content items that are most relevant to the particular user's intentions.

In an embodiment, a cross-cohort optimization system may store, within memory, cohort definition criteria for each cohort of the plurality of cohorts. For a particular user, for each cohort, the cross-cohort optimization system may identify content items that belong to a specific cohort based upon the cohort definition criteria. Using a machine-learned model, the cross-cohort optimization system may generate a score for the specific cohort with respect to the particular user's intentions. The cross-cohort optimization system may generate a ranking for the cohorts based on the respective scores of each cohort. Based on the ranking of the cohorts, the content management system may cause the content items of each cohort to be displayed concurrently on a computing device of the particular user.

The disclosed approaches provide advantages over conventional solutions by implementing a cross-cohort optimization model that scores and ranks cohorts of content items based upon known and unknown intentions of the particular user. The dynamic selection and ranking of cohorts on an individual user basis ensures that relevant content will be presented to each user of the system. By optimizing which categories of content items are presented to each user's landing page, user engagement may be increased over conventional solutions that statically configure where categories of content items are presented on a user's landing page.

System Overview

Figure 1:
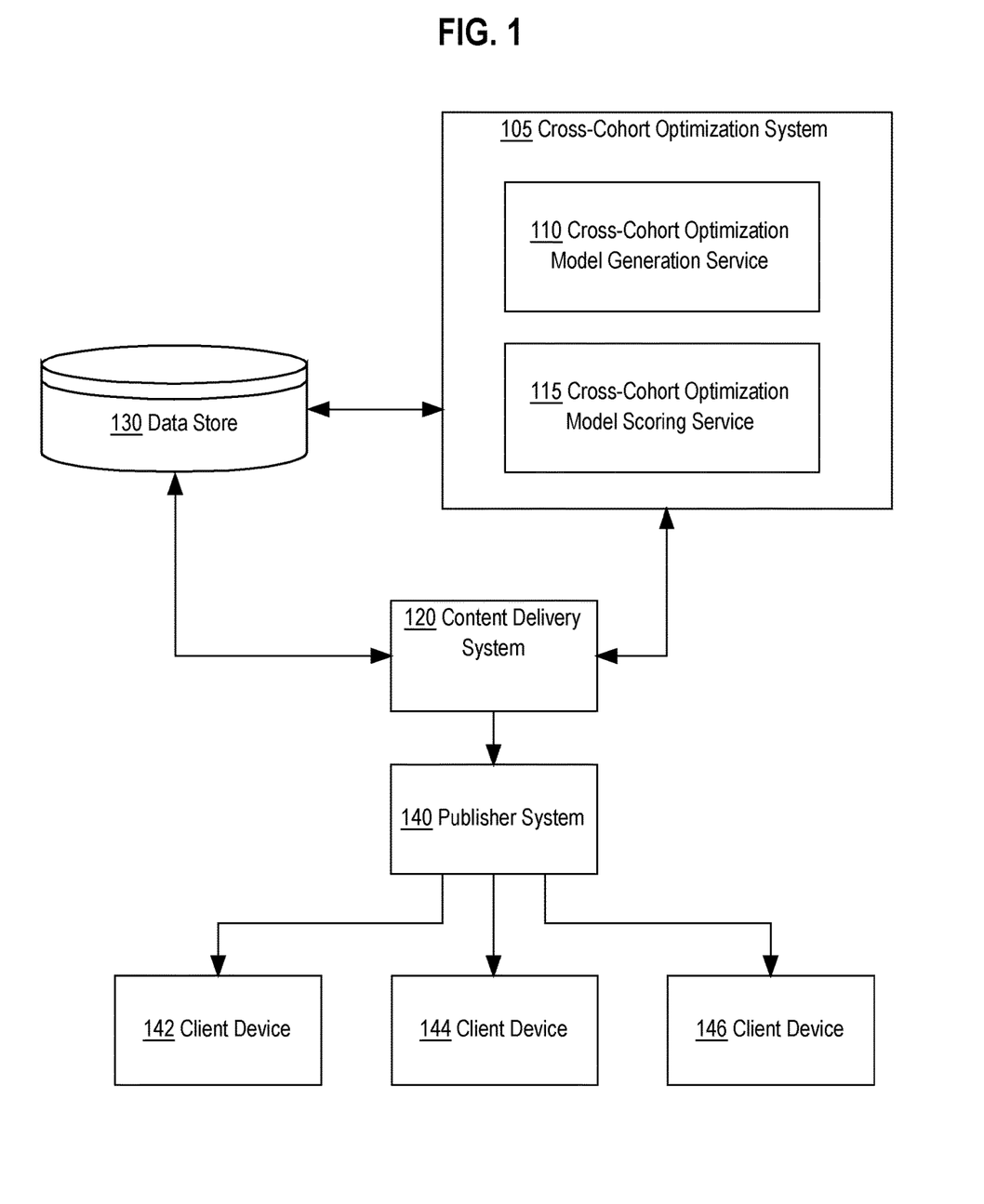
FIG. 1 is a block diagram that depicts a system for selecting and distributing content items to one or more end-users, in an embodiment.

FIG. 1 is a block diagram that depicts a system 100 for selecting and distributing content items to one or more end-users, in an embodiment. System 100 may represent a least some portions of a content management system. System 100 includes a cross-cohort optimization system 105, a content delivery system 120, a data store 130, a publisher system 140, and client devices 142-146. Content providers (not shown) provide content items to content delivery system 120, which in turn selects content items to provide to publisher system 140 for presentation to users of client devices 142-146. Content providers communicate with content delivery system 120 over a network, such as a LAN, WAN, or the Internet.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 may include a content provider interface that allows content providers to create and manage their respective content delivery campaigns and a content delivery exchange that conducts content item selection events in response to content requests from a third-party content delivery exchange and/or from publisher systems, such as publisher system 140.

Publisher system 140 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 140 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 140 provides the requested content (e.g., a web page) to the client device.

Simultaneously or immediately before or after the requested content is sent to a client device, a content request is sent to content delivery system 120. That request is sent (over a network, such as a LAN, WAN, or the Internet) by publisher system 140 or by the client device that requested the original content from publisher system 140. In response to receiving a content request the content delivery system 120 initiates a content item selection event that involves selecting one or more content items (from among multiple content items) to present to the client device that initiated the content request. An example of a content item selection event is an auction.

Content delivery system 120 and publisher system 140 may be owned and operated by the same entity or party. Alternatively, content delivery system 120 and publisher system 140 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device. A content item may also represent a user profile of another user of the content management system. For instance, when a user selects the content item representing another user's profile, a request is sent to the content management system to display the user profile page for the selected user.

Examples of client devices 142-146 include desktop computers, laptop computers, tablet computers, wearable devices, video game consoles, and smartphones.

In an embodiment, the data store 130 may represent data storage configured to store user interaction data from user sessions, user profile data, such as user attributes, content item selection data, such as marketplace auction data, cohort definition criteria that defines associated attributes of cohorts. For example, the data store 130 may store user profile data, a weeks' worth of user interaction data, content item attribute data used to group content items within cohorts, as well as cohort definition criteria.

Cohorts

As described, cohorts are groups of content items that share one or more similar characteristics, such as similar user profile attributes, or similar content item properties. Cohorts may be categorized by the type of content items contained within the cohort and/or by the similarities between content item properties. For example, content items that represent other user profiles may by grouped within "people-you-may-know" cohort types. The people-you-may-know cohort type may include several different cohorts that may be based on common user profile attributes of other users. For instance, the people-you-may-know cohort type may include, but is not limited to, cohorts based upon a common educational institution, common employer, common interests, common social groups, common geographic area, and any other relevant user profile attribute. For example, if a target user's profile indicates that they attended UC Berkeley, then a "people-you-may-know who attended UC Berkeley" cohort that contains content items of user profiles of users that attended UC Berkeley may be relevant to the target user. In another example, if the target user works at LinkedIn, then a "people-you-may-know who work at LinkedIn" cohort may be relevant to the target user.

Other cohort types may include cohorts based on a particular topic of interest, cohorts related to a specific series, and any other property or attribute that may be used to group content items together. An example of generating cohorts based on a particular topic may include hashtag cohorts which group content items together that have been tagged using the same hashtag. For instance, an artificial intelligence cohort may include content items that have been tagged with one or more hashtags related to artificial intelligence.

In an embodiment, a plurality of cohorts may be ranked for presentation based upon their relevance to the target user, where the target user represents the user engaged in a particular user session. For example, if the target user initiates a user session to find other users for the purpose of growing their network of connections, then the plurality of cohorts may be ranked in an order that displays cohorts related to connecting to other users first. By displaying the most relevant cohorts first, the target user may be able to more efficiently find other users of interest and connect to the other users.

Figure 2:
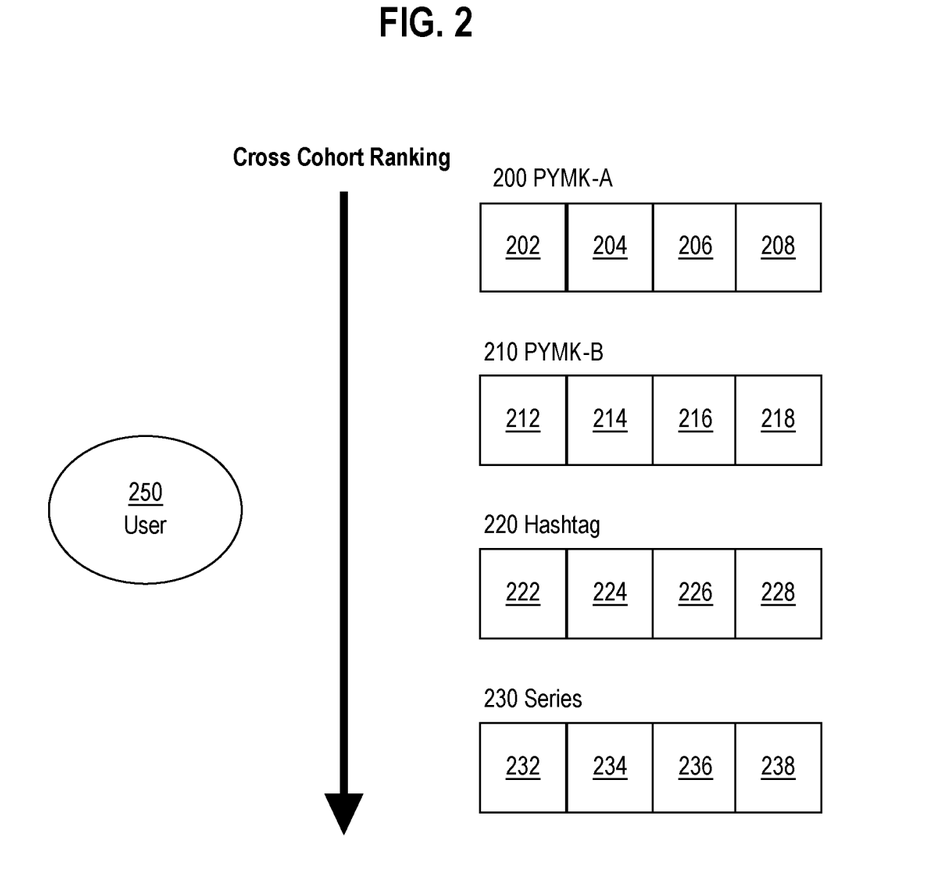
FIG. 2 illustrates an example of how ranked cohorts may be displayed to a user on a client device, in an embodiment.

FIG. 2 illustrates an example of how ranked cohorts may be displayed to a user on a client device 142. User 250 represents the target user. Cohort rankings for the plurality of cohorts may differ depending on the identified intentions of user 250. For example, if user 250's intention for their corresponding user session is to increase their network of users, then the cohort ranking may rank cohorts that include user profiles higher than other types of cohorts. Cohort people-you-may-know A (PYMK-A 200) may represent user profiles of users that attended the same university as user 250. Cohort PYMK-B 210 may represent user profiles of users that work in the same industry as user 250. Cohort hashtag 220 may represent content items related to a particular topic, such as artificial intelligence. Cohort series 230 may represent a set of video content items for a specific series on learning how design mobile applications. Cohorts 200 and 210 are ranked higher than cohorts 220 and 230 because cohorts 200 and 210 contain content items of user profiles, which is more relevant to user 250's intention of increasing their network of users. If, however, user 250's intention is to consume content related to artificial intelligence, then cohort 220 may be ranked higher than the other cohorts.

Cross-Cohort Optimization System

In an embodiment, the cross-cohort optimization system 105 implements a cross-cohort optimization model that generates a user-specific score for each cohort based upon the user's derived user intentions for their user session. A user may have one or more specific intentions in mind when initiating a user session. For example, a user may intend to, during their user session, increase their network of users, consume content about a particular topic, and/or any other desired intention. Users are not limited to having only one specific intention in mind and may have multiple intentions for a user session. User intentions may be derived from a user's prior interactions in previous user sessions, a user's profile attributes, and any other observable user metrics.

The cross-cohort optimization model may use a set of identified user intentions, such as increasing the network of users or consuming content on a specific subject. However, there may be additional user intentions, not previously known, that may factor into the cross-cohort optimization model. In an embodiment, the cross-cohort optimization model may discover one or more latent intentions of the user. Latent intentions may represent user intentions that are not directly observable but are inferred from the cross-cohort optimization model itself. The known user intentions and the derived latent intentions may be used by the cross-cohort optimization model to score each cohort with respect to the specific user.

In an embodiment, the calculated score for a particular cohort from the cross-cohort optimization model may represent how likely content items within the particular cohort satisfy the intentions of the user. A high score calculated for the particular cohort may increase the likelihood that the user will click on or otherwise interact with a content item within the particular cohort. For example, if the user's intentions include consuming content related to machine learning, then the particular cohort representing "articles on machine learning" may receive a high score from the cross-cohort optimization model, as it is more likely that the user will interact with content items within an "articles on machine learning" cohort than content items within other cohorts. A low score calculated for a second cohort may indicate that it is less likely that the user will interact with content items within the second cohort. For instance, if the second cohort represents "people-you-may-know that attended UC Berkeley" and the user's intentions include consuming content related to machine learning, then the second cohort may receive a lower score than other cohorts related to machine learning content.

In an embodiment, the cross-cohort optimization system 105 may be communicatively coupled to the content delivery system 120 for the purposes of ranking a plurality of cohorts that contain content items selected by the content delivery system 120 for a content delivery campaign. In another embodiment (not shown in FIG. 1), the cross-cohort optimization system 105 may be integrated as part of the content delivery system 120. In an embodiment, the cross-cohort optimization system 105 may include a cross-cohort optimization model generation service 110 and a cross-cohort optimization model scoring service 115.

In an embodiment, the cross-cohort optimization system 105 may be communicatively coupled to the data store 130 for the purposes of retrieving user-specific profile attributes, user interaction data, cohort attribute data, content item specific data, and storing cohort definition criteria as well as user and cohort specific model parameter values and user-specific cohort scores.

Cross-Cohort Optimization Model

The cross-cohort optimization model may be implemented using an algorithm that incorporates user and cohort features, identified user intentions, latent intentions, utility scores representing content management system objectives, and error and bias terms. In an embodiment, the cross-cohort optimization model may be implemented using a logistic regression algorithm with gradient descent. The cross-cohort optimization model may be represented as:

$$logit(y_{ij}) = \beta x_{ij} + \alpha_1 s_{i,connect} + \alpha_2 s_{i,content} + l_i^T c_j + \gamma P_{ij}^{FPR} + \sum_k \delta_k 1_{\{Typeofj==k\}} + \varepsilon_{ij}$$

where:

i represents the index value for a particular user and j represents the index value for a particular cohort.

The logit($y_{ij}$) function is a natural log of the probability that $y_{ij}$ equals 1, where $y_{ij}=1$, if the user i clicks on one of the top 3 presented content items within cohort j. The top 3 presented content items represent content items, within the cohort, that are presented at the client device without needing the user to scroll within the cohort to click on a specific content item. For example, cohorts may contain several content items which may be viewed by scrolling horizontally within the cohort j. The top 3 content items may be initially presented to the user, within the cohort, such that the user does not need to scroll in order to click on one of the top 3 content items. The number of top content items may be configurable depending on the layout of the content items and the size of the display area within the client device. For instance, if the user is using a desktop computer for the user session, then the cohort may be able to initially display 5 content items within the cohort without having to scroll through the content items.

$x_{ij}$ represents a feature vector that contains user features and cohort features, where the user and cohort features represent attributes and other observed metrics, such as user interaction data.

The $s_{i,connect}$ and $s_{i,content}$ represent observable user intents. The $s_{i,connect}$ represents an affinity score reflecting the intent of user i to engage with PYMK cohort types. The $s_{i,content}$ represents an affinity score reflecting the intent of user i to engage with content-based cohort types. In an embodiment, the cross-cohort optimization model may include more or less affinity scores representing other cohort types.

The $l_i^T c_j$ values represent the latent factors which capture unobservable latent intents of user i. The $l_i^T$ represents a transpose of a vector containing the latent intents of user i. The $c_j$ represents a vector containing values that represent the propensity of users to interact with cohort j with respect to the latent intents. For example, if three latent intents are derived then $l_i^T$ transpose vector may be represented as $[l_{i1}, l_{i2}, l_{i3}]_{1\times 3}$ for the three latent intents, and the $c_j$ vector may be represented as $[c_{j1}, c_{j2}, c_{j3}]_{1\times 3}$ for the three latent intents.

The $P_{ij}^{FPR}$ represents a value calculated by a first-pass ranker algorithm for recommending content items for a particular user using a separate content item selection model implemented by the content delivery system 120.

The $\Sigma_k \delta_k 1_{\{Type\ of\ j==k\}}$ represents a bias term for previously undefined cohort types. The $1_{\{Type\ of\ j==k\}}$ is an indicator feature that indicates whether cohort j is of cohort type k, where cohort type k is an element of the set of defined cohort types. For example, defined cohort types may include the set of {PYMK, hashtag, series, group}. The $\delta_k$ represents an unknown configurable parameter that is determined during model training.

The $\varepsilon_{ij}$ is an error term.

The $\beta$, $\alpha_1$, $\alpha_2$, $\gamma$, $\delta_k$ represent unknown logistic regression coefficients that are determined during model training.

Training the cross-cohort optimization model is described in the CROSS-COHORT OPTIMIZATION MODEL TRAINING section herein.

User & Cohort Features

In an embodiment, the feature vector $x_{ij}$ may contain several different user-based features, cohort-based features, and user-cohort pair features. User-based features may include, but are not limited to, user profile attributes, user interaction features, user invitation based features, user network features, and job seeking intent features. User profile attributes include attributes about the user that are stored within a user's profile, such as current and past employer, educational degrees, educational institutions attended, social groups, educational and professional certificates, and past and present place of residence, and any other recorded profile attribute.

User interaction features may represent behavior of how the user interacted with various tabs, pages, and products within the content management system. For example, the user interaction features may include the user's historical interaction activity with the PYMK tab or with any other page or product within the content management system. The user interaction features may be collected and analyzed by other machine learning models implemented by the content delivery system 120 or other systems within the larger content management system.

User invitation based features may represent metrics for how many invitations to connect a user received over a specific period of time. For example, the user received 100 invitations to connect from other users. In an embodiment, the user invitation based features may be represented as the log(1+(number of invitations received)). As another example of a user invitation based feature, the user has sent 50 invitations to connect with other users.

User network features may represent metrics representing the number of connections a user has. For example, if a user's network of first-degree connections is 400 people, then their user network would be 400 other users. In an embodiment, the user network features may be represented as the log(1+ connection_count).

The job seeking intent features may represent observed attributes and user interactions that relate to the job seeking intent. For example, user interactions where the user visits the PYMK tab, interacts with the job search features and views job search results, visits pages of users and companies that are actively looking for candidates, and any other observable job seeking interactions. In an embodiment, the cross-cohort optimization model may derive a job seeking intent feature value from the observed user attributes and user interactions. In another embodiment, a separate machine-learned model implemented by either the content delivery system 120 or another system may be used to derive the job seeking intent feature value.

In an embodiment, user-cohort pair features may include, but are not limited to, user-cohort specific impression metrics, the degree of relationships between users, and any other user/cohort common attributes. The user-cohort specific impression metrics may represent impression metrics that are specific to the user and the specific cohort. For example, impression count metrics may be identified for impressions of content items within the specific cohort for the specific user. The degree of relationships between users may represent how many common connections exist between a pair of users and/or the number of common connections between the specific user and content items that represent other users within a specific cohort. For example, user A may be connected to users D and E and user B may be connected to users C and D. User A and user B have a common connection of user D, and as a result the common connection value between users A and B would be 1. If another user, such as user Y, has no common connections with user A, then the common connection value between users A and Y would be zero.

In an embodiment, cohort-based features may represent cohort attributes such as the type of cohort, content item-based rankings, random-effect coefficients, and any other cohort attributes. An example of the type of cohort attribute may be PYMK for a cohort that represents "people-you-may-know who work at LinkedIn". Another example may be a content cohort type for the cohort "articles related to AI."

The random-effect-coefficients may represent a multi-dimensional vector, such as a 5-dimensional vector, calculated using a machine-learned model. The machine-learned model may be any commercial or proprietary model that is used to calculate a random-effect-coefficient-embedding for each cohort. The random-effect-coefficient-embeddings capture similarities between cohorts and are a mathematical representation of the cohorts in a 5-dimensional space, such that if two cohorts are similar then the dot-product between the 5-dimension random-effect-coefficient-embeddings of the two cohorts would be a large value. The random-effect-coefficient-embedding is used as a cohort feature such that, for cohort j, the embedding is concatenated as a 5-dimensional vector with the $x_{ij}$ feature vector in the cross-cohort optimization model.

First-Pass Ranker Score

The $P_{ij}^{FPR}$ represents a value calculated by a first-pass ranker algorithm for recommending content items for a particular user. In an embodiment, the first-pass ranker may represent an external machine-learned model implemented to score and rank content items for presentation to a user. The first-pass ranker (FPR) score may be based on a desired objective such as optimizing for click-throughs. Some embodiments of the FPR score may represent any other desired objective such as, optimizing for increasing a network of connections ($P_{connect}$), increasing the number of hashtags followed by a user ($P_{follow}$), increasing the number of subscriptions to content ($P_{subscribe}$), or any other objective. In yet other embodiments, FPR scores for different objectives may be merged to represent multiple desired objectives.

The content delivery system 120 may implement the first-pass ranker algorithm, which may by any conventional or proprietary machine-learned model. In an embodiment, a set of content items may be assigned an FPR score by the content delivery system 120. The set of content items may be ranked, and then a subset of the top 5 content items may be selected for calculating the $P_{ij}^{FPR}$ value for the cohort that contains the set of content items. The $P_{ij}^{FPR}$ value may be calculated as an average of the FPR scores of the top 5 content items in the subset:

$$P_{ij}^{FPR} = \frac{1}{5} \Sigma_{h=1}^{5} P_{ijh}^{FPR}$$

where $P_{ijh}^{FPR}$ represents the FPR score for user i and content item h within cohort j.

In other embodiments, the number of content items used to calculate the cohort $P_{ij}^{FPR}$ may vary. For example, the $P_{ij}^{FPR}$ value may be an average of 3 content item FPR scores or may be an average of 10 content item FPR scores. In yet other embodiments, the positional value of each content item within the cohort may be used to assign a weight to each FPR score for each content item. For instance, the content item in the first position may be given a higher weight than the content item in the fifth position. In yet other embodiments, the $P_{ij}^{FPR}$ value may be implemented using other functions other than an average function, such as median, or weighted averages.

Affinity Scores for Observable User Intents

The calculated affinity scores represent scores assigned to observable intents for the user. For example, $s_{i,connect}$ represents an affinity score reflecting the intent of user i to engage with PYMK cohort types. In an embodiment, the $s_{i,connect}$ may be calculated as the maximum likelihood estimation (MLE) of the number of clicks on a content item within a PYMK cohort divided by the total number of clicks by the user. Calculating the $s_{i,connect}$ may be represented as:

$$s_{i,connect} = \frac{\#(y_{i,PYMK-cohort} = 1)}{\Sigma_j \#(y_{i,j} = 1) + 2 + |C| + 1}$$

where the numerator (i.e., $\#(y_{i,PYMK-cohort}=1)$) represents the number of clicks on content items within cohorts that have a PYMK type. The denominator (i.e., $\Sigma_j \#(y_{i,j}=1)+2+|C|+1$) is the sum of the total number of clicks on content items within all cohorts, where |C| is the total number of identified cohorts.

In an embodiment, the $s_{i,content}$ may be calculated as the MLE of the number of clicks on a content item within a content cohort divided by the total number of clicks by the user. Calculating the $s_{i,content}$ may be represented as:

$$s_{i,content} = \frac{\#(y_{i,Content-cohort} = 1)}{\Sigma_j \#(y_{i,j} = 1) + 2 + |C| + 1}$$

where $\#(y_{i,Content-cohort}=1)$ represents the number of clicks on content items within cohorts that have a content type. The $\Sigma_j \#(y_{i,j}=1)+2+|C|+1$ is the sum of the total number of clicks on content items within all cohorts, where |C| is the total number of identified cohorts.

FPR-Independent Cross-Cohort Optimization Model

In some scenarios, the cross-cohort optimization model may need to be re-trained when FPR scores, for the plurality of cohorts, are not available or new FPR scores have been calculated by the content delivery system 120. If new FPR scores have been calculated, then each of the regression coefficients and the latent intent values will need to be recalibrated. In an embodiment, the cross-cohort optimization model may be implemented using a logistic regression algorithm with gradient descent that is not dependent on FPR scores. This embodiment of the cross-cohort optimization model may be represented as:

$$logit(y_{ij}) = \beta x_{ij} + \alpha_1 s_{i,connect} + \alpha_2 s_{i,content} + l_i^T c_j + \sum_k \delta_k 1_{\{Type\ of\ j==k\}} + \varepsilon_{ij}$$

where the cohort $\gamma P_{ij}^{FPR}$ has been omitted.

Additional Cross-Cohort Optimization Model Embodiments

In an embodiment, the cross-cohort optimization model may be implemented where the FPR score component is factored into the model at a per-content item (per cohort) basis. That is, the $P_{ij}^{FPR}$ score is factored for each content item. The cross-cohort optimization model may be represented as:

$$logit(y_{ij}) = \beta x_{ij} + \alpha_1 s_{i,connect} + \alpha_2 s_{i,content} + l_i^T c_j + \gamma_j P_{ij}^{FPR} + \sum_k \delta_k 1_{\{Type\ of\ j==k\}} + \varepsilon_{ij}$$

where the $\gamma_j$ represents the item (cohort) level effects for the $P_{ij}^{FPR}$ FPR scores.

In another embodiment, the cross-cohort optimization model may be implemented where the latent member intents are determined using latent projection of user features. The cross-cohort optimization model may be represented as:

$$logit(y_{ij}) = \beta x_{ij} + \alpha_1 s_{i,connect} + \alpha_2 s_{i,content} + \delta_j g(x_i) + \gamma_j P_{ij}^{FPR} + \sum_k \delta_k 1_{\{Type\ of\ j==k\}} + \varepsilon_{ij}$$

where:

$\delta_j$ is the content item (cohort) level random effect, g function is a parameterized unknown function, $x_i$ is a feature vector containing user features, and $g(x_i)$ is a latent projection of user features that represents latent user intents.

Cross-Cohort Optimization Model Generation Service

The cross-cohort optimization model generation service 110 may store cohort definition criteria in the data store 130. Cohort definition criteria may include cohort attributes used to describe specific cohorts. Cohort definition criteria may be derived from user profiles and user interaction data observed by the cross-cohort optimization system 105 or may be provided by content management system administrators or other users. For example, an administrator may manually define cohort attributes for a new cohort. The cross-cohort optimization model generation service 110 may then store cohort definition criteria for the new cohort in the data store 130.

In an embodiment, the cross-cohort optimization model generation service 110 may retrieve, from the data store 130, user attributes and historical user interaction data for users, cohort definition criteria, including cohort attributes, and any other user, cohort, and content item information needed to generate and train the cross-cohort optimization model for a specific user.

Cross-Cohort Optimization Model Scoring Service

In an embodiment, the cross-cohort optimization model scoring service 115 assigns a score to each of the cohorts for the specific user using the cross-cohort optimization model. For example, the cross-cohort optimization model scoring service 115 may calculate scores for each cohort using the specific user's profile attributes and historical user interaction data, the cohort attributes, and the identified content items for each respective cohort. Upon calculating scores for each cohort, the cross-cohort optimization model scoring service 115 may rank the cohorts for presentation on a client device.

Processing Overview

Figure 3:
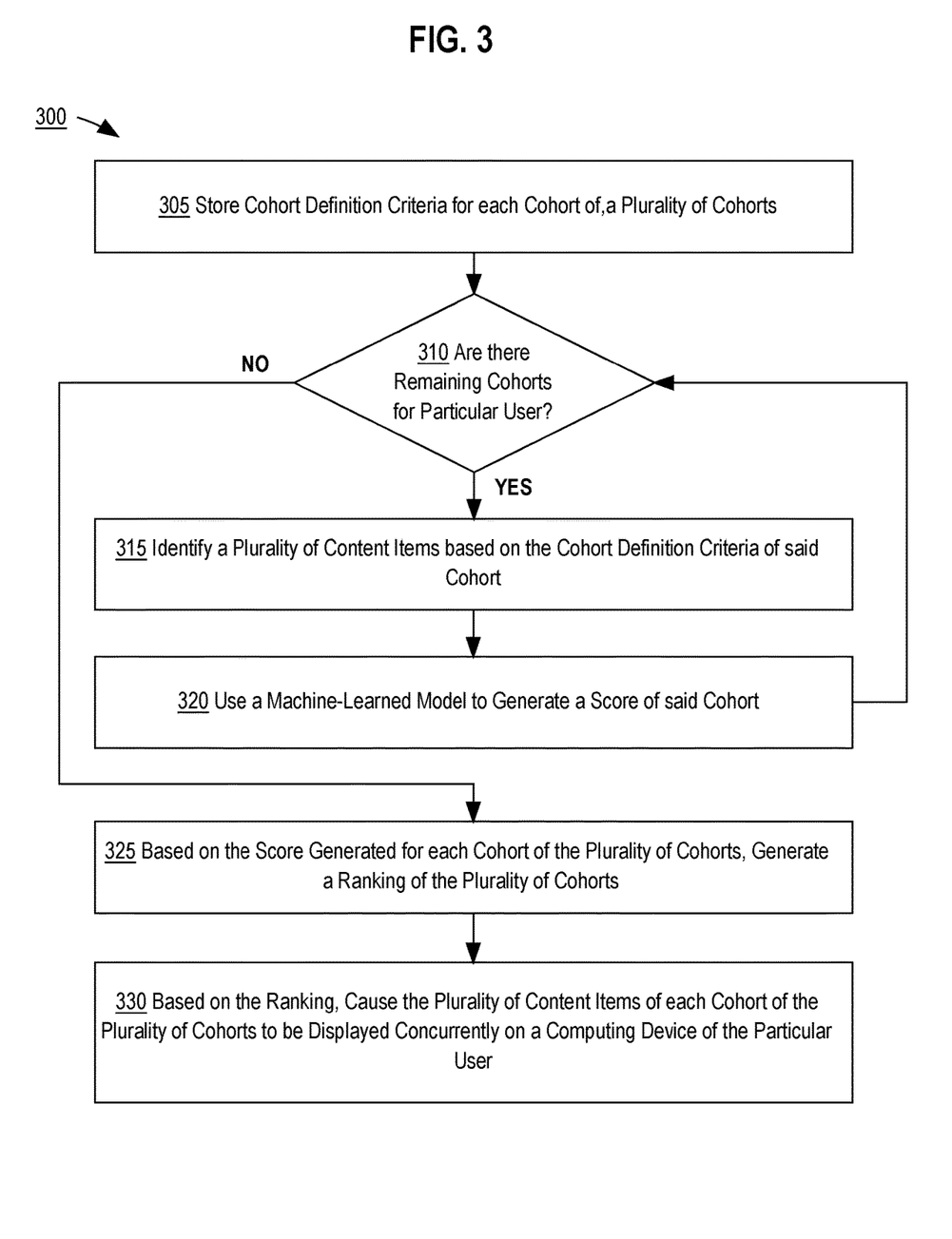
FIG. 3 depicts an example flowchart for scoring and ranking a plurality of cohorts, and causing display of a plurality of content items within their respective ranked cohorts on a client device, in an embodiment.

FIG. 3 depicts an example flowchart for scoring and ranking a plurality of cohorts, and causing display of a plurality of content items within their respective ranked cohorts on a client device. Process 300 may be performed by a single program or multiple programs. The operations of the process as shown in FIG. 3 may be implemented using processor-executable instructions that are stored in computer memory. For purposes of providing a clear example, the operations of FIG. 3 are described as performed by the cross-cohort optimization system 105 and its components. For the purposes of clarity process 300 is described in terms of a single entity.

In operation 305, process 300 stores cohort definition criteria for each cohort of a plurality of cohorts. In an embodiment, the cross-cohort optimization model generation service 110 stores, within the data store 130, cohort definition criteria that may include cohort attributes used to describe the cohorts and to identify content items belonging to respective cohorts. In an embodiment, the cross-cohort optimization model generation service 110 may optionally store newly identified cohorts, such as user-defined cohorts.

In an embodiment, for a particular user, the cross-cohort optimization model scoring service 115 may iterate over each cohort of the plurality of cohorts to calculate scores for each cohort using the cross-cohort optimization model. Operations 310-320 describe the process of selecting and scoring each cohort of the plurality of cohorts with respect to the particular user. In operation 310, process 300 determines whether there are remaining cohorts to score for the particular user. In an embodiment, if there are remaining cohorts to score, then cross-cohort optimization model scoring service 115 selects the next cohort from the plurality of cohorts that needs to be scored and proceeds to operation 315. If, however, there are no remaining cohorts to score, then cross-cohort optimization model scoring service 115 proceeds to operation 325 to generate a ranking of the plurality of cohorts.

In operation 315, process 300 identifies a plurality of content items based on the cohort definition criteria of said cohort. In an embodiment, the cross-cohort optimization model scoring service 115 retrieves from the content delivery system 120 the plurality of content items that are to be presented to the particular user. The content delivery system 120 may implement any number of content item selection algorithms to select the plurality of content items for the particular user. Upon retrieving the plurality of content items for the particular user, the cross-cohort optimization model scoring service 115 identifies a subset of content items that match the cohort definition criteria for the selected cohort. For example, if the selected cohort is "content related to AI" then the cross-cohort optimization model scoring service 115 may identify content items that are related to the topic AI, such as articles, posts, shares, and any other content that has been tagged with an AI hashtag or is otherwise related to the topic AI.

In operation 320, process 300 uses a machine-learned model to generate a score for the selected cohort. In an embodiment, the cross-cohort optimization model scoring service 115 may use cross-cohort optimization model algorithm to score the selected cohort:

$$logit(y_{ij}) = \beta x_{ij} + \alpha_1 s_{i,connect} + \alpha_2 s_{i,content} + l_i^T c_j + \gamma P_{ij}^{FPR} + \sum_k \delta_k 1_{\{Type\ of\ j==k\}} + \varepsilon_{ij}$$

where i is the particular user and j is the selected cohort.

Upon generating a score for the selected cohort, process 300 proceeds back to operation 310 to determine whether there are any remaining cohorts, in the plurality of cohorts, to score. If there are no remaining cohorts to score, then process 300 proceeds to operation 325.

In operation 325, process 300 generates a ranking of the plurality of cohorts based on the score generated for each cohort of the plurality of cohorts. In an embodiment, the cross-cohort optimization model scoring service 115 ranks each of the cohorts according to their respective scores. The scores may be ranked in descending order, where the highest scoring cohort is assigned the first position. The second highest scoring cohort is assigned the second position, and so on. Referring to FIG. 3, cohorts 300-330 are ranked in descending order, such that cohort PYMK-A 200 has the highest score and is ranked first. Cohort PYMK-B 210 has the second highest score and is ranked second. Cohort hashtag 220 has the third highest score and is ranked third. Cohort series 230 has the fourth highest score and is ranked fourth.

In operation 330, process 300 causes the plurality of content items of each cohort of the plurality of cohorts to be displayed concurrently, based on the ranking, on a computing device. In an embodiment, cross-cohort optimization system 105 sends the plurality of cohorts, including their respective rankings and their respective content items, to the content delivery system 120. The content delivery system 120 then uses the publisher system 140 to cause display of the plurality of content items on client device 142, where the plurality of content items is organized and displayed within their respective cohorts. The plurality of cohorts is displayed in ranked order, with the highest ranked cohort displayed at the top of the list of cohorts. In an embodiment, each of the cohorts, including their respective content items, are displayed concurrently on client device 142.

Cross-Cohort Optimization Model Training

Figure 4:
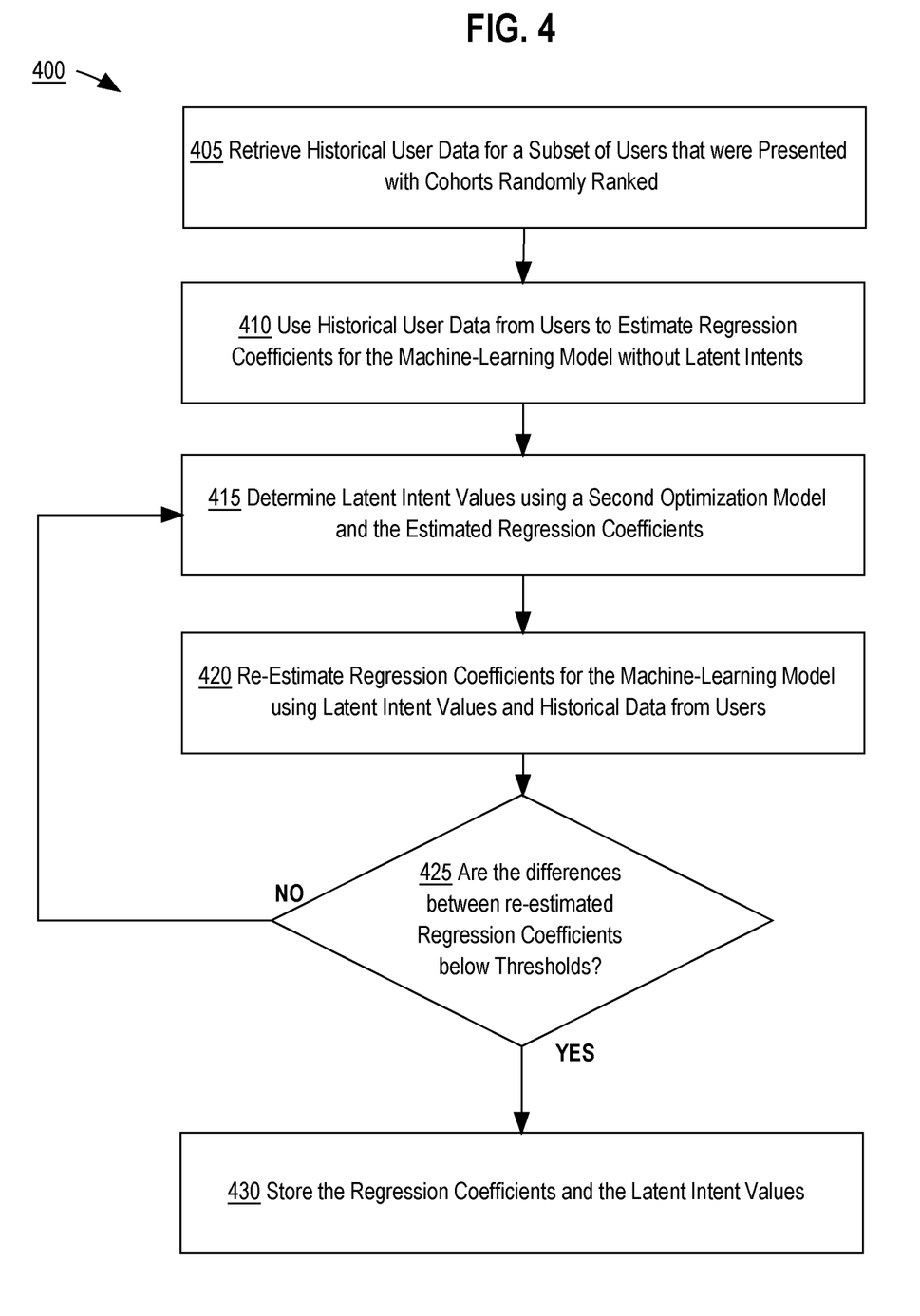
FIG. 4 depicts an example flowchart for training a cross-cohort optimization model by determining regression coefficients and latent intent values, in an embodiment.

The cross-cohort optimization model generation service 110 may train the cross-cohort optimization model for users using historical interaction data from a subset of users. FIG. 4 depicts an example flowchart for training the cross-cohort optimization model by determining regression coefficients and latent intent values. Process 400 may be performed by a single program or multiple programs. The operations of the process as shown in FIG. 4 may be implemented using processor-executable instructions that are stored in computer memory. For purposes of providing a clear example, the operations of FIG. 4 are described as performed by the cross-cohort optimization system 105 and its components. For the purposes of clarity process 400 is described in terms of a single entity.

In operation 405, process 400 retrieves historical user data for a subset of users that were presented with cohorts that were randomly ranked. In an embodiment, the cross-cohort optimization system 105 may have previously performed one or more online experiments on a subset of users within the content management platform. The subset of users may represent a percentage of the total set of users on the content management platform. For example, the subset of users may be 5% of the total set of users. In other examples, the subset of users may be a larger or smaller percentage of the total set of users. The one or more online experiments may include presenting content items, within their respective cohorts, to the subset of users, where the cohorts are randomly ranked. For example, ranking of cohorts is not determined by user intentions, rather the randomly ranked cohorts are presented to the subset of users and the subsequent user interactions are recorded. The subsequent user interactions and user profile attributes for the subset of users represent the historical user data, which may be used to train the cross-cohort optimization model.

In an embodiment, the historical user data for the subset of users may be formatted and stored within the data store 130 as training data. The training data may include data and label data. The data may specify the ranked order of cohorts displayed to users, subsequent user interactions with content items within the ranked cohorts, user profile attributes for each user that interacted with the content items within the ranked cohorts, and attributes associated with each of the cohorts presented. The label data may include metrics corresponding to values, such as a 1 representing that the user clicked on one of the top three content items within a ranked cohort and a 0 representing that the user did not click on one of the top three content items within a ranked cohort. The cross-cohort optimization system 105 may retrieve the historical user data from the data store 130 for the purposes of training the cross-cohort optimization model.

In operation 410, process 400 uses historical user data from users to estimate regression coefficients for the machine-learning model without latent intents. In an embodiment, the cross-cohort optimization model generation service 110 may implement a cross-cohort optimization model that does not incorporate latent intent factors. Instead factors associated within latent intents of users are incorporated into an error term. The modified cross-cohort optimization model algorithm may be represented as:

$$logit(y_{ij}) = \beta x_{ij} + \alpha_1 s_{i,connect} + \alpha_2 s_{i,content} + \gamma P_{ij}^{FPR} + \sum_k \delta_k 1_{\{Type\ of\ j==k\}} + \varepsilon'_{ij}$$

where:

$\varepsilon'_{ij}$ represents an error term that incorporates both an error and any observed latent intent factors. The $\beta$, $\alpha_1$, $\alpha_2$, $\gamma$, $\delta_k$ represent unknown logistic regression coefficients that are estimated as $\hat{\beta}$, $\widehat{\alpha_1}$, $\widehat{\alpha_2}$, $\hat{\gamma}$, $\widehat{\delta_k}$.

In operation 415, process 400 determines latent intent values using a second optimization model and the estimated regression coefficients. In an embodiment, the cross-cohort optimization model generation service 110 may implement the second optimization model as a matrix factorization model to estimate the latent intent values $l_i^T c_j$. Matrix factorization is a class of collaborative filtering algorithms that may be used to identify latent intent values. For example, matrix-factorization learns the latent factors by decomposing the $l_i^T c_j$ values into the product of two vectors. Matrix-factorization learns vectors $[l_{i1}, l_{i2}, l_{i3}]_{1 \times 3}$ and $[c_{j1}, c_{j2}, c_{j3}]_{1 \times 3}$, the product of which yields $l_i^T c_j$.

The following algorithm representing $\varepsilon'_{ij}$ describes how the latent intent values $l_i^T c_j$ may be determined using matrix factorization as:

$$\varepsilon'_{ij} = l_i^T c_j + \varepsilon_{ij}$$

where $\varepsilon'_{ij}$ includes the latent intent values $l_i^T c_j$ and the $\varepsilon_{ij}$ error term. Determining the latent intent values may be rewritten as:

$$\hat{l}_i^T \hat{c}_j + \varepsilon_{ij} = logit(y_{i,j}) - \left(\hat{\beta} x_{ij} + \widehat{\alpha_1} s_{i,connect} + \widehat{\alpha_2} s_{i,content} + \hat{\gamma} P_{ij}^{FPR} + \sum_k \widehat{\delta_k} 1_{\{Type\,of\,j==k\}}\right)$$

where $\hat{l}_i^T$ and $\hat{c}_j$ represent estimated latent intent values, such that $\hat{l}_i^T = [\hat{l}_{i1}, \hat{l}_{i2}, \hat{l}_{i3}]_{1\times 3}$ and $\hat{c}_j = [\hat{c}_{j1}, \hat{c}_{j2}, \hat{c}_{j3}]_{1\times 3}$.

In operation 420, process 400 re-estimates regression coefficients for the machine-learning model using the estimated latent intent values and historical data from users. In an embodiment, the cross-cohort optimization model generation service 110 may use the estimated latent intent values from operation 415 and the historical data from users as training data to re-estimate the regression coefficients. By re-estimating the regression coefficients, accounting for the estimated latent intent values, the regression coefficients may be refined for the purposes of training a more accurate cross-cohort optimization model that accurately accounts for the latent factors. The cross-cohort optimization model used to re-estimate the regression coefficients may be represented as:

$$logit(y_{i,j}) = \beta x_{i,j} + \alpha_1 s_{i,connect} + \alpha_2 s_{i,content} + l_i^T c_j + \gamma P_{ij}^{FPR} + \sum_k \delta_k 1_{\{Type\,of\,j==k\}} + \varepsilon_{ij}$$

where the $\beta$, $\alpha_1$, $\alpha_2$, $\gamma$, $\delta_k$ regression coefficients are estimated as $\hat{\beta}$, $\widehat{\alpha_1}$, $\widehat{\alpha_2}$, $\hat{\gamma}$, $\widehat{\delta_k}$.

In operation 425, process 400 determines whether the differences between the estimated regression coefficients and the re-estimated regression coefficients are below thresholds. In an embodiment, the cross-cohort optimization model generation service 110 may implement a set of threshold values that represent allowable differences between the estimated regression coefficients from operation 410 and the re-estimated regression coefficients from operation 420. If the differences are below the set of thresholds, then that means the re-estimated regression coefficients are similar enough to the estimated regression coefficients such that the latent intent values $l_i^T c_j$ have been accurately modeled and process 400 may proceed to operation 430. If, however, the differences between the estimated regression coefficients and the re-estimated regression coefficients are greater than the set of thresholds, then the regression coefficients and the latent intent values need to be recalibrated such that latent intent values are accurately reflected in $l_i^T c_j$ and the regression coefficients are adjusted accordingly.

In an embodiment, recalibration may include re-estimating the latent intent values using the re-estimated regression coefficients from operation 420. For example, process 400 may return to operation 415 to re-estimate the latent intent values using the matrix factorization model and the re-estimated regression coefficients from operation 420 as the regression coefficients. Upon re-estimating the latent intent values using the matrix factorization model, process 400 may proceed to operation 420 to re-estimate the regression coefficients using the cross-cohort optimization model, where the latent intent values are the re-estimated latent intent values from operation 415. Process 400 may then proceed to operation 425 to determine whether the differences between the re-estimated regression coefficients and the newly re-estimated regression coefficients are below the set of thresholds. If the re-estimated regression coefficients and the newly re-estimated regression coefficients are below set of thresholds then process 400 may proceed to operation 430. If, however, the differences are still above the set of thresholds, then process 400 may return to operations 415 and 420 to re-calibrate the regression coefficients and the latent intent values. Process 400 may iterate over operations 415-425 until the differences are below the set of thresholds.

In operation 430, process 400 stores the regression coefficients and the latent intent values. In an embodiment, the cross-cohort optimization system 105 may store the regression coefficients and the latent intent values in the data store 105 for later use by the cross-cohort optimization scoring service 115.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
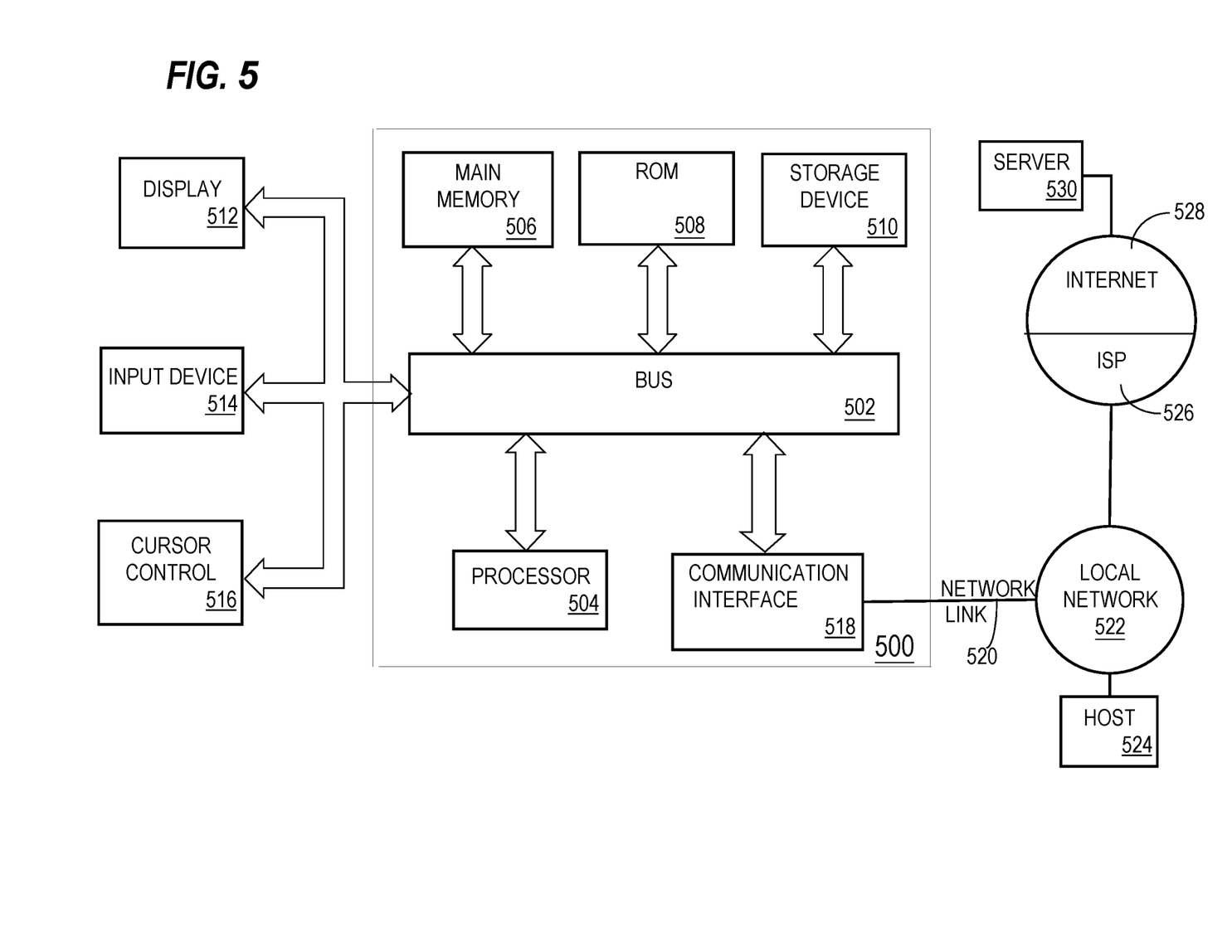
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    storing cohort definition criteria for each cohort of a plurality of cohorts; for a particular user and for each cohort of the plurality of cohorts:
    identifying a plurality of content items based on the cohort definition criteria of said each cohort;
    training a machine learning model based on interactions of a subset of users with a set of randomly ranked cohorts, wherein the interactions comprise a stored set of historical user actions including a plurality of time intervals, and wherein training the machine learning model comprises:
        using the historical user actions including selections by a subset of users in response to being presented with content items within the plurality of cohorts displayed concurrently in a randomly ranked order to derive estimated regression coefficients for the-machine learning model;

determining latent intents using a second model and the estimated regression coefficients;

re-estimating the regression coefficients using the machine learning model and the latent intents;

determining that differences between the estimated regression coefficients and the re-estimated regression coefficients are below thresholds; and storing the re-estimated regression coefficients and the latent intents in memory for later use in the machine learning model;

using the machine learning model to generate a score of said each cohort, wherein the score for each cohort of the set of randomly ranked cohorts is specific to a user of the subset of users based on the interactions between the user and said each cohort;

based on the score generated for each cohort of the plurality of cohorts, generating a ranking of the plurality of cohorts;

based on the ranking, causing the plurality of content items of each cohort of the plurality of cohorts to be displayed concurrently on a computing device of the particular user;

wherein the method is performed by one or more computing devices.

2. The computer-implemented method of claim 1, wherein using the machine learning model to generate the score of said each cohort comprises calculating the score of said cohort with respect to the particular user based upon at least one of user features of the particular user, cohort features of said cohort, cross user-cohort features of the particular user and said cohort, defined user intents that represent identified user intentions for a user session, or latent intents.

3. The computer-implemented method of claim 2, wherein the latent intents represent hidden intentions of a plurality of users based upon historical user interaction data related to interacting with the content items within the plurality of cohorts, wherein the historical user interaction data comprises a metric that indicates that a user clicked on a selected one of the content items.

4. The computer-implemented method of claim 2, wherein the user features of the particular user comprise at least one of user profile attributes, historical user interaction data, a number of user invitations received by the particular user, a number of connections for the particular user, or user interactions related to job seeking.

5. The computer-implemented method of claim 2, wherein the cohort feature of said cohort comprise at least one of a cohort type, content item-based rankings for content items within said cohort, or random-effect coefficients of said cohort.

6. The computer-implemented method of claim 2, wherein the user-cohort features of the particular user and said cohort comprise at least one of a said cohort-specific impression metrics, and degrees of relations between the particular user and user profile-based content items within said cohort.

7. The computer-implemented method of claim 1, wherein the plurality of cohorts comprise one or more cohort types comprising a people-you-may-know cohort type, a hashtag cohort type, or a series cohort type.

8. The computer-implemented method of claim 7, wherein the people-you-may-know cohort type comprises at least one of a people-you-may-know that have a similar job title, people-you-may-know went to the same school, people-you-may-know that work at the same company, and people-you-may-know that are in your industry.

9. The computer-implemented method of claim 1, wherein the machine learning model incorporates calculated content item based scores that represent one or more desired objectives, wherein the one or more desired objectives comprise increasing click-through rate, increasing a number of connections, increasing a number of hashtags followed, or increasing a number of subscriptions.

10. The computer-implemented method of claim 1, wherein the machine learning model incorporates an affinity score for an observable user intent of increasing a number of connections for the particular user.

11. The computer-implemented method of claim 1, wherein the machine learning model incorporates an affinity score for an observable user intent of increasing an amount of content items consumed by the particular user.

12. A computer program product comprising:

one or more non-transitory computer-readable storage media comprising instructions which, when executed by one or more processors, cause:

storing cohort definition criteria for each cohort of a plurality of cohorts; for a particular user and for each cohort of the plurality of cohorts:

identifying a plurality of content items based on the cohort definition criteria of said each cohort;

training a machine learning model based on interactions of a subset of users with a set of randomly ranked cohorts, wherein the interactions comprise a stored set of historical user actions including a plurality of time intervals, and wherein training the machine learning model comprises:

using the historical user actions includes selections by a subset of users in response to being presented with content items within the plurality of cohorts displayed concurrently in a randomly ranked order to derive estimated regression coefficients for the-machine learning model;

determining latent intents using a second model and the estimated regression coefficients;

re-estimating the regression coefficients using the machine learning model and the latent intents;

determining that differences between the estimated regression coefficients and the re-estimated regression coefficients are below thresholds; and storing the re-estimated regression coefficients and the latent intents in memory for later use in the machine learning model;

using the machine learning model to generate a score of said each cohort; based on the score generated for each cohort of the plurality of cohorts, generating a ranking of the plurality of cohorts;

based on the ranking, causing the plurality of content items of each cohort of the plurality of cohorts to be displayed concurrently on a computing device of the particular user.

13. The computer program product of claim 12, wherein using the machine learning model to generate the score of said each cohort comprises calculating the score of said cohort with respect to the particular user based upon at least one of user features of the particular user, cohort features of said cohort, cross user-cohort features of the particular user and said cohort, defined user intents that represent identified user intentions for a user session, or latent intents.

14. The computer program product of claim 13, wherein the latent intents represent hidden intentions of a plurality of users based upon historical user interaction data related to interacting with the content items within the plurality of cohorts.

15. The computer program product of claim 13, wherein the user features of the particular user comprise at least one of user profile attributes, historical user interaction data, a number of user invitations received by the particular user, a number of connections for the particular user, or user interactions related to job seeking.

16. The computer program product of claim 13, wherein the cohort feature of said cohort comprise at least one of a cohort type, content item-based rankings for content items within said cohort, or random-effect coefficients of said cohort.

17. The computer program product of claim 13, wherein the user-cohort features of the particular user and said cohort comprise at least one of a said cohort-specific impression metrics, and degrees of relations between the particular user and user profile-based content items within said cohort.

18. The computer program product of claim 12, wherein the plurality of cohorts comprise one or more cohort types comprising a people-you-may-know cohort type, a hashtag cohort type, or a series cohort type.

* * * * *